Figure 1:
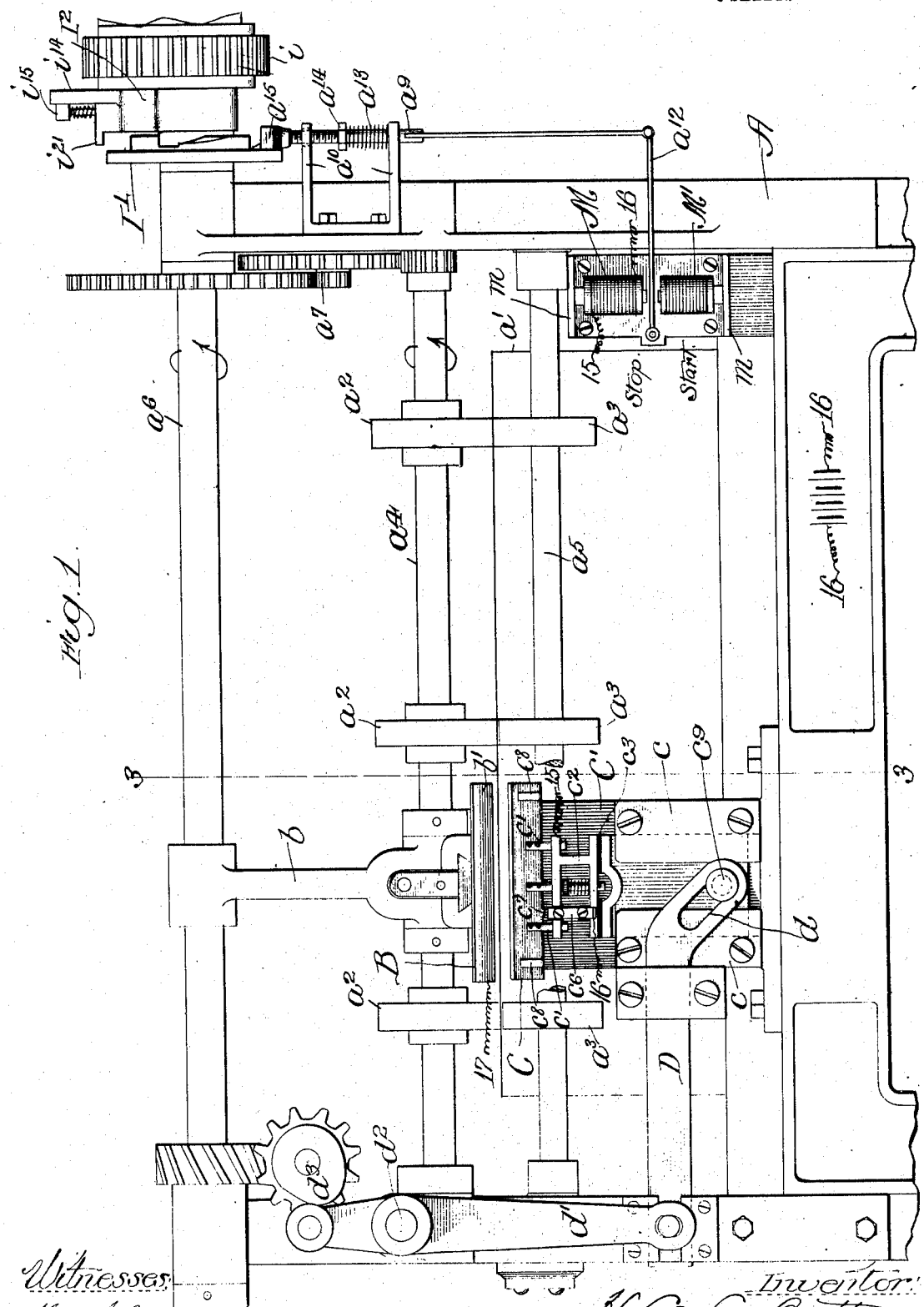

H. C. LA BATT.
CONTROLLER FOR PAPER HANDLING MACHINES.
APPLICATION FILED DEC. 17, 1902. RENEWED JAN. 10, 1910.

968,063.

Patented Aug. 23, 1910.
5 SHEETS—SHEET 1.

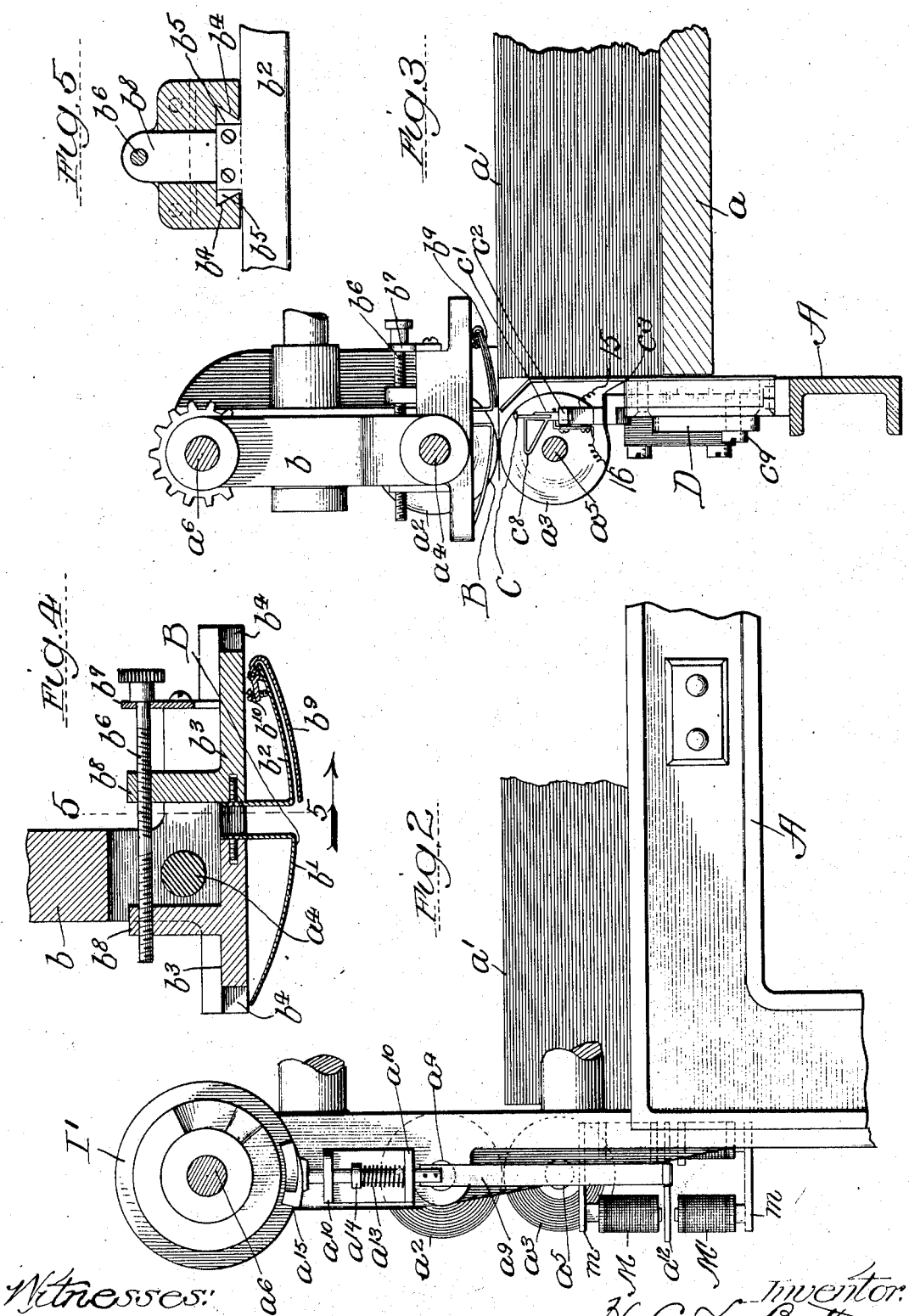

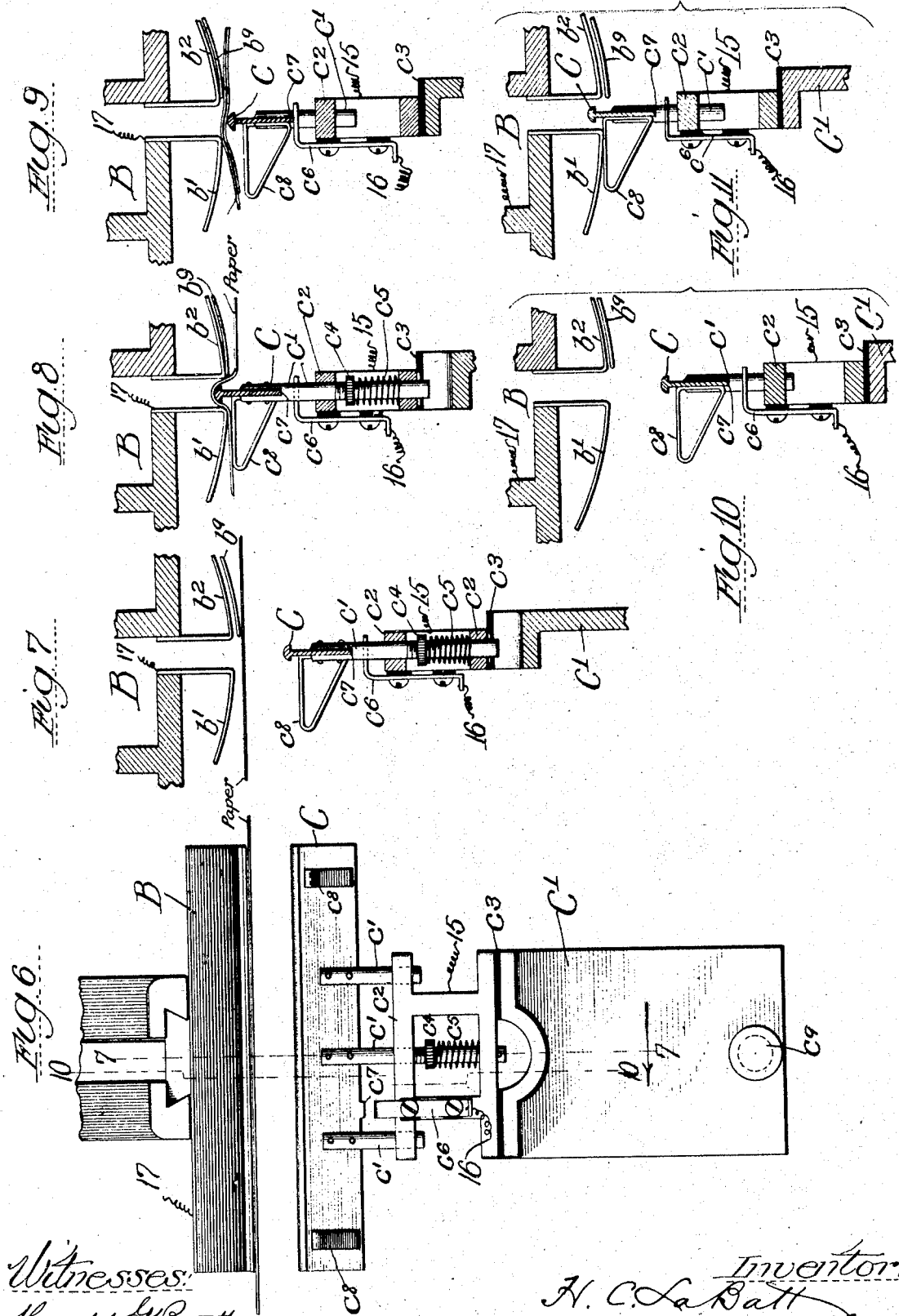

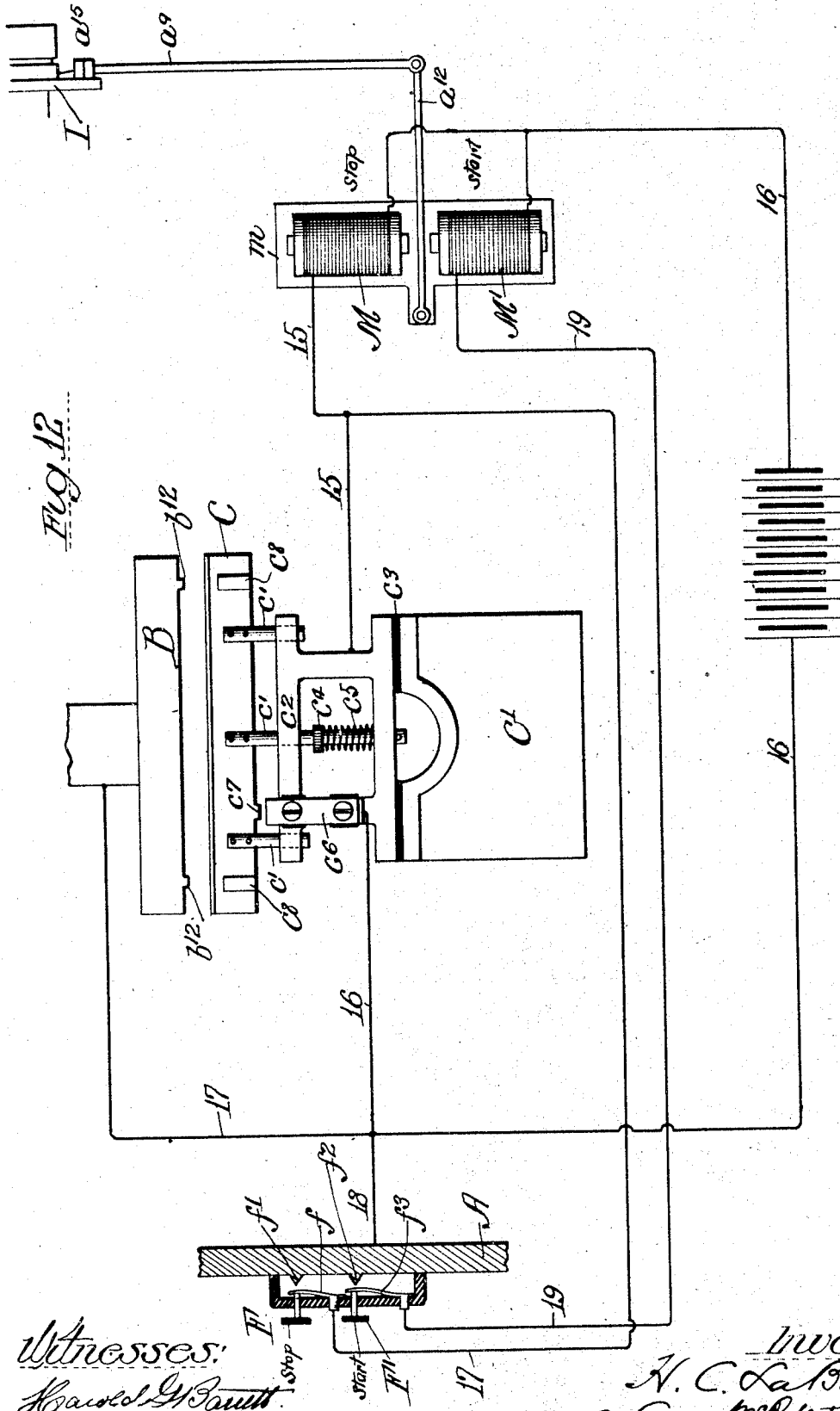

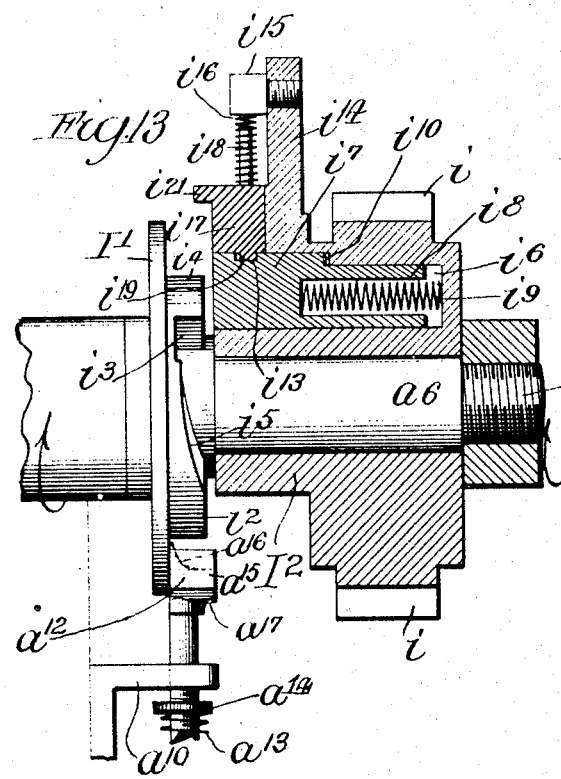
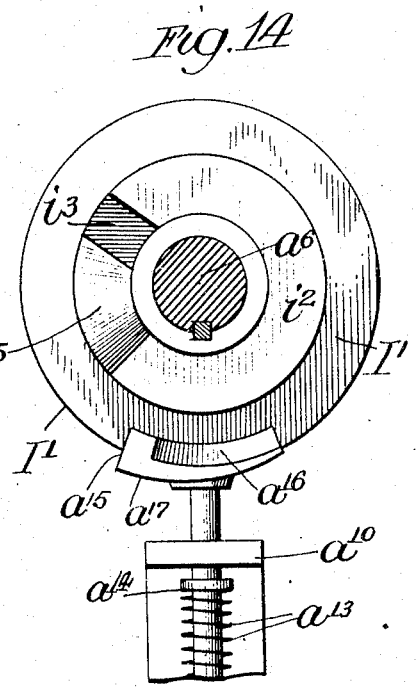
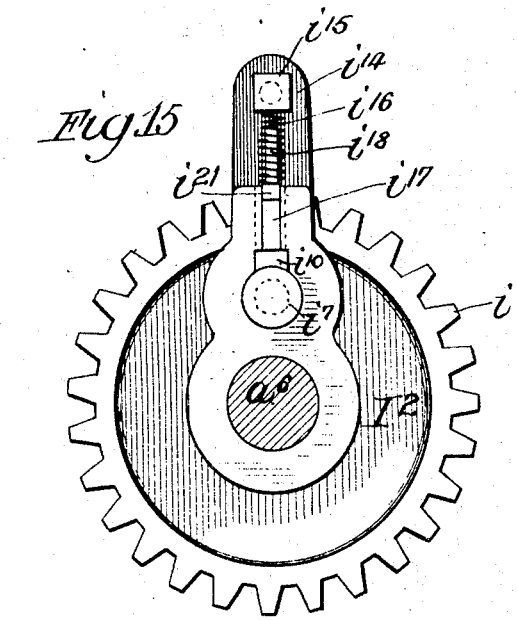
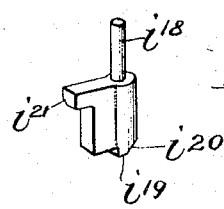
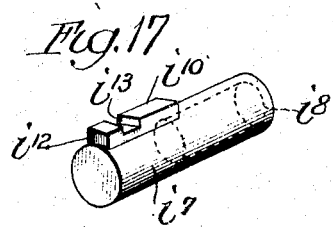

UNITED STATES PATENT OFFICE.

HOMER C. LA BATT, OF CHICAGO, ILLINOIS, ASSIGNOR TO WILLIAM J. HERRICK, OF CHICAGO, ILLINOIS.

CONTROLLER FOR PAPER-HANDLING MACHINES.

968,063.   Specification of Letters Patent.   Patented Aug. 23, 1910.

Application filed December 17, 1902, Serial No. 135,529.   Renewed January 10, 1910.   Serial No. 537,336.

*To all whom it may concern:*

Be it known that I, HOMER C. LA BATT, a citizen of the United States, residing at Chicago, in the county of Cook and State of Illinois, have invented certain new and useful Improvements in Controllers for Paper-Handling Machines, (Case No. 4,) of which the following is a specification.

My invention relates to controlling devices adapted to be associated with machines for handling paper, such as feeders, folders, printing presses, calendering and like machines.

One object of the invention is to provide a new and improved form of stop-device which will stop the machine with which it is associated when more than the normal predetermined thickness of paper is in the machine.

Another object is to provide a stop-device which will stop the machine when for any reason no paper is present.

Another object is to provide a combined no-sheet and plurality-sheet stop-device.

A further object of the invention is to provide a combined stop and start mechanism, which is operated manually for the latter function, and manually or automatically for the former function.

Other objects of the invention will be apparent from the description and the appended claims.

In the accompanying drawings, which illustrate an exemplification of my invention, associated for convenience with a sheet-feeding machine—Figure 1 is a front view in elevation of a sheet-feeding machine provided with my improvements, parts being broken away for clearness of illustration; Fig. 2 is a part side view and part sectional view in elevation of parts of the machine of Fig. 1, the view being taken from the right hand side thereof; Fig. 3 is a view on the line 3—3 of Fig. 1; Fig. 4 is a view in cross-section of the stationary member of the controller; Fig. 5 is a sectional view on the line 5—5 of Fig. 4; Fig. 6 is a detail front view of the coöperating lips and tongue and the carriage for the latter, with a sheet of paper between the lips and tongue; Fig. 7 is a detail sectional view on the line 7—7 of Fig. 6, showing the same parts in the same positions; Fig. 8 is a detail sectional view similar to Fig. 7, but showing the parts in their secondary or closed position when a normal thickness of paper is between the lips and tongue; Fig. 9 is a detail sectional view similar to Fig. 8 but showing the position of the parts when paper of abnormal thickness is interposed between the lips and tongue; Fig. 10 is a detail sectional view similar to Fig. 9, and showing the lips and tongue opened or separated; Fig. 11 is a view similar to Fig. 10, and showing the positions of the parts when the tongue is moved into the mouth between the lips and no paper is interposed between them; Fig. 12 is a diagrammatic view illustrating the various electrical circuits and associated devices; Fig. 13 is a detail view of a form of clutch that may be employed, parts thereof being shown in section; Fig. 14 is a detail view showing the driven element of the clutch in elevation; Fig. 15 is a detail view in elevation of the driving element of the clutch; Fig. 16 is a detail view of the catch of Fig. 13; and Fig. 17 is a perspective view of the pin of Fig. 13.

In the drawings the reference letter A denotes the frame of any suitable machine with which the device is to be associated, and is of suitable form and dimensions for the various operating parts.

While my invention is applicable to any of the various types of machines which handle paper for any purpose, I have shown it in connection with a sheet-feeding machine as illustrating a convenient and useful application thereof.

The vertically-movable paper-table $a$ carries a supply of paper, usually in the form of loose sheets $a'$, which are fed one at a time by any suitable mechanism (not shown), and are ejected from the machine by suitable devices, such as the front feed rolls $a^2$ and $a^3$, which are mounted on suitable shafts $a^4$ and $a^5$, and coöperate in any suitable manner. The roller-shafts are driven from any suitable through-shaft, as $a^6$, by means of intermediate gearing $a^7$. The shaft $a^6$ receives its motion from any suitable source through an intermediate clutch I, of any suitable form, mounted upon an extension or stub $a^8$ of the through-shaft and driven from any suitable motor. The clutch is controlled by any suitable means, as by the operating or controlling rod $a^9$, which slides in suitable guides $a^{10}$ on one side of the main-frame. The controlling rod stands normally in such position that it does not affect the clutch, but when it is raised it operates to unship the clutch to stop the machine. The controlling rod $a^9$ is operated by means of a lever $a^{12}$, to the outer free end of which it is attached, the inner end of the lever being suitably pivoted upon the machine. The lever constitutes the armature of a suitable electromagnet M, the core or pole-pieces of which are in operative relation thereto, as shown in Figs. 1 and 12. It is obvious that when an electric current is caused to flow through the coils of the electromagnet M, its core will be magnetized to draw up the armature-lever $a^{12}$, and the controlling-rod will co-act with the clutch to unship the latter, whereby the shaft $a^6$ is detached from the constantly running or driving member $I^2$ of the clutch.

The coil of the stop-magnet M is in a normally open circuit including a suitable battery or other source of electrical energy, as shown in Figs. 1 and 12. This circuit is open at the lip member B and tongue C, by which it is made and broken as will be presently described in detail. The lip member B and tongue C are mounted at any suitable point in the path of the paper. In the exemplification shown in the drawings, they are mounted near the front of the machine and immediately in the rear of the ejecting rolls, in such position that the paper passes between them as it is fed out of the machine. The lip member B, is held in fixed position with respect to the line of travel of the paper, and is normally just above the path of the paper. The tongue C, is mounted to reciprocate toward and away from the stationary lip member. The lip member B is supported in any suitable manner, as by means of a bracket $b$ attached to any suitable part of the machine, and is composed of a pair of curved angular lips $b'$ and $b^2$, which are adjustable toward and away from each other, for a purpose hereinafter described, and which are always separated a sufficient distance to form a mouth to allow the movable tongue C to enter between them, all as shown in Figs. 7 to 11.

The movable tongue C is carried in alinement with the mouth formed by the lips $b'$ and $b^2$ on a carriage C′, which reciprocates in suitable guides or ways $c$ on the machine frame. The carriage is moved by any suitable means, being timed to reach its upward stroke or limit to close the tongue and lips together when the paper is stationary between the same, for example, in a sheet-feeder, at the moment before the ejector rollers act upon the sheet. The tongue C is movably mounted on the carriage C′, and is supported by means of guide pins $c'$, which enter slots in the head $c^2$ carried by the carriage and insulated therefrom by a suitable strip $c^3$ of insulating material. One of the guide pins is provided with an adjustable collar $c^4$, which is threaded upon the shank of the pin, and between which and a suitable part of the head is interposed a coiled spring $c^5$, which serves to maintain the tongue C in yielding position in extension of the carriage. The head $c^2$ carries an insulated terminal $c^6$, which is within the path of and contacts with a terminal $c^7$ of the tongue C, when the latter is moved on the head against the tension of the spring $c^5$. The head is connected with one end of the coil of the electromagnet M, as by a wire 15, and the head and tongue C are in electrical continuity, as by making the parts of metal or by providing suitable conductors. The terminal $c^6$, which is insulated from the head $c^2$ by intermediate strips of insulating material, as clearly shown in Fig. 9 for example, is electrically connected by a conductor 16 to the opposite end of the coil of the electromagnet M, the battery being included in this electrical path, all as clearly shown in Fig. 12, the conductors 15 and 16 being broken away in Fig. 1 for convenience of illustration. It is obvious that the terminal $c^7$ of the tongue C and the terminal $c^6$ of the head constitute the terminals of a normally open circuit including the electromagnet M and a suitable battery, and when these terminals are caused to contact the current will flow from the battery through the magnet-coil, and the armature-lever $a^{12}$ will raise the rod $a^9$ to unship the clutch. These terminals are brought into register or contact by the resistance of the paper when the carriage C′ is reciprocated. The stroke of the carriage causes the tongue C to enter the mouth formed by the lips $b'$ and $b^2$, as clearly shown in Fig. 8, the paper being interposed between the tongue and lips, and preferably being at that time stationary. If paper of normal predetermined thickness is in the path of the moving tongue, as for example in Fig. 8, the resistance of the paper is not great enough to depress the tongue C against the force of its spring $c^5$ to cause the terminals $c^6$ and $c^7$ to contact, but the paper will be bent or deflected within the mouth of the lips $b'$ and $b^2$ as shown in Fig. 8, and the circuit through the magnet M will not be closed. However, when paper of greater thickness, as for example when two or more sheets move together, is in the path of the tongue C, as in Fig. 9, the resistance of the paper is sufficient to depress the tongue C against the force of its spring $c^5$, until the terminal $c^7$ of the tongue contacts with the terminal $c^6$ of the head, as shown in Fig. 9, when the circuit will be completed through the stop-magnet M, with the result above stated.

The lips $b'$ and $b^2$ are adjustable to make the mouth formed between them wide or narrow according to the character of the stock handled by the machine. For example, when paper that is easily bent or deflected is employed, as for newspaper work, the mouth is made relatively narrow, as the paper readily yields; when heavy stock or paper that is not easily deflected is employed, as cardboard, etc., the mouth is widened so that the stock will have more surface within which to yield. To provide for this adjustment, one or both of the lips may be made movable. The lips are carried on blocks $b^3$, and, as shown in Figs. 4 and 5, the bracket $b$ is provided with undercut grooves or ways $b^4$ in which the beveled edges $b^5$ of the blocks $b^3$ slide. The blocks are adjusted and held in adjusted positions by a right and left hand screw $b^6$, which is mounted in a portion $b^7$ of the bracket and engages suitably threaded openings in upturned portions $b^8$ of the blocks. The rear lip is preferably provided with a clip $b^9$, which is pivoted to the outer edge of the lip and is held in adjusted position by a set screw $b^{10}$, as shown in Fig. 4. The outer or free end of the clip is in alinement with the mouth. At times the paper, especially when light stock is used, will curl up at its front edge and have a tendency to enter the mouth. The clip guides the paper over the opening, deflecting it somewhat away from the lips. The clip is in the form of a light spring, and when the tongue moves upwardly, it readily turns on its pivot or yields to fold close up against the lip $b^2$ as shown in Fig. 8.

In order to utilize the device as a stop-mechanism when no paper is between the tongue and lips, I electrically connect the lip member B by a conductor 17 to the same end of the magnet coil as the wire 16 connects, this being arranged in any suitable manner, as for example, as shown in Fig. 12. When the tongue C is at the limit of its stroke, its terminals $c^8$, which are in electrical continuity of the conductor 15, contact with opposite terminals $b^{12}$ on one of the lips, as shown in Figs. 11 and 12, and complete the circuit through the stop-magnet M. It will be observed that the paper forms an insulation for the terminals $c^8$ and $b^{12}$ when stock is present in the machine, as in Figs. 8 and 9, and that when no stock is present the terminals $c^8$ and $b^{12}$ coöperate, while the depression of the tongue C is not then sufficient to close the contact through the terminals $c^6$ and $c^7$, all as shown in Fig. 11. The movement of the tongue C upon the head in the operation illustrated in Figs. 10 and 11 is very slight, so the terminals $c^6$ and $c^7$ do not register to close their circuit.

The carriage C' is reciprocated by any suitable means. In the exemplification shown it is provided with a headed pin $c^9$, which engages a cam groove $d$ in a reciprocating slide D, which is suitably guided on the machine-frame and is moved by a pendulum lever $d'$, which is pivoted to the frame at $d^2$ and is operated by a suitable cam $d^3$. The motion of the carriage may be provided by any suitable means.

Any suitable clutch may be provided between the motor and the shaft $a^6$, but as I prefer to throw the clutch both on and off by means of the controller $a^9$, in order to provide a combined stopping and starting device, I provide a clutch that is opened by the controller or rod moving in one direction of its movement and closed by the rod moving in the opposite direction. For this purpose the controller is held in a balanced position by the spring $a^{13}$ surrounding the rod and interposed between a guide $a^{10}$ and an adjustable collar $a^{14}$ on the rod. By this means the controller is balanced in position, and when moved in either direction will return to its normal central position. The head $a^{15}$ of the controller is provided with a lateral cam-face $a^{16}$ and with a peripheral cam-face $a^{17}$ that is eccentric to the shaft $a^6$.

A clutch suitably adapted for the purposes herein set forth is shown in detail in Figs. 13 to 17, and comprises a disk I', which is suitably keyed to the shaft $a^6$, and a driving member I², which is loosely mounted on the projecting end or stub $a^8$ of the shaft and is constantly rotated by any suitable means, as the gear wheel $i$, being held on the stub by a suitable collar, all as shown in Fig. 13. The disk I' is provided on its operative face with a lateral flange $i^2$, which is cut away or recessed at any suitable point to form a seat $i^3$, having one wall or face abrupt for its full depth, as at $i^4$, and the other wall or face abrupt for a portion of its depth and then developing into an incline $i^5$. The driving member I² is in the form of a rotating sleeve, and is provided on its inner face with a recess $i^6$, in which a pin $i^7$ is seated so as to be in line with the flange $i^2$ of the disk I'. The pin is provided with a pocket $i^8$ in its rear end, which receives a protracting spring $i^9$, bearing between the base of the pocket and the inner wall of the recess of the sleeve to eject the pin when it is released. The pin is provided on its outer face with a stop or ledge $i^{10}$, which fits in a correspondingly shaped cutaway of the recess $i^6$ and holds the pin from turning as well as limiting its inward movement. The pin is clearly shown in the detail view of Fig. 17. The stop is formed with an angular shoulder $i^{12}$ on its outer face, and is provided with a crosscut $i^{13}$ in its upper side, forming a recess. The sleeve I² is provided with a radial standard $i^{14}$, having a bracket $i^{15}$ at or near its outer end, against which one end of a coiled spring $i^{16}$ bears, its opposite end bearing on a catch $i^{17}$, guided in the standard and provided with a pin $i^{18}$, about which the spring is coiled. The catch is provided with a lug $i^{19}$ on its lower end, having an inclined or rounded rear face $i^{20}$, and with a lateral front shoulder $i^{21}$, these parts being shown more clearly in the detached view of Fig. 16.

When the parts are in the position of Fig. 13, the members of the clutch are disengaged, and as the sleeve or driving member $I^2$ revolves, the projection or shoulder $i^{21}$ passes outside of and beyond the eccentric face $a^{17}$, and does not contact with the head. If now the controller is lowered, by moving the rod $a^9$ downward, it will project the eccentric face $a^{17}$, on the under surface of the head, into the path of the shoulder $i^{21}$, which in the revolution of the sleeve will pass up the incline of the face, whereby the catch $i^{17}$ is raised against its spring to withdraw the lug $i^{19}$ from engagement with the recess $i^{18}$, and the pin $i^7$ is thereby unlatched and is then projected by its spring $i^9$ against the flange $i^2$ and passes down the incline $i^5$ into the seat $i^3$ as the sleeve rotates, to lock the sleeve and disk together to rotate the shaft $a^6$. The parts remain in this relation, whereby the shaft $a^6$ is driven, until the machine is stopped either by the manual operation of the attendant or by the automatic operation of the tongue and lips. When the machine is to be stopped, the rod $a^9$ is raised, whereby the lateral cam $a^{16}$ of the head is projected into the path of the angular shoulder $i^{12}$, and as the sleeve rotates the cam retracts the pin $i^7$ until the spring-pressed lock $i^{19}$ again engages its seat $i^{18}$. The locking pin $i^7$ is then held in retracted position, and the parts of the clutch are disconnected.

In the exemplification shown it is obvious that the unshipping of the clutch is produced by the action of the stop-magnet M upon the armature-lever $a^{12}$, by closing the circuit through this magnet either from the stop-button F or from either of the two sets of terminals on the tongue and lips. It is also apparent that the movement of the controller to lock the members of the clutch together may be accomplished by any suitable means which will draw the controller in the appropriate direction, and as a convenient way of accomplishing this function I provide the starting magnet M', which is in a normally open circuit controlled by the starting-button F'.

In order to allow the operator to stop the machine, I provide a switch at any convenient place and which may be of any suitable type. In the drawings, I have shown a push-button F bearing upon a spring-terminal $f$, which is connected to one end of the magnet-coil M, as by means of a conductor 17—15, and which may be caused to contact with a second terminal $f'$ (such as a portion of the machine-frame) suitably connected to the other end of the magnet-coil as by a conductor 18—16, whereby the circuit is closed through the stop-magnet. In order to provide convenient means to start the machine, I mount the starting magnet M' with its core or pole-pieces in operative relation to the lever-armature $a^{12}$, so as to draw the latter in the opposite direction from the movement imparted to it by the magnet M. A convenient way of arranging these elements is shown in Figs. 1 and 12, where the magnets are upon opposite sides of the armature-lever being supported by a suitable bracket $m$. The starting-magnet M' is included in a normally open circuit with a battery, preferably the same battery as supplies current to the stop-magnet, by tying one of its coil ends to the wire 16, as shown in Fig. 12, which then leads through the battery and thence by the loop 18 to the frame-terminal $f^2$. The other end of the coil of the electromagnet M' is connected by a conductor 19 to a spring-terminal $f^3$ which is adapted to be depressed against the terminal $f^2$ by a starting-button F', to close the circuit through the starting-magnet M'. The several circuits are shown in the diagrammatic view in Fig. 12.

While I have shown and described a form of clutch adapted to start and stop the shaft, and a balanced controller for the clutch, it is obvious that I may employ any other suitable mechanism for this purpose; also, that I may employ a clutch adapted to be unshipped only by the associated mechanism, being locked manually. I do not herein specifically claim the clutch disclosed, but only as it broadly enters into certain combinations, reserving this feature for a separate application.

It is apparent that when no paper is between the tongue and lips the circuit through the stop-magnet will be closed by the contact of the terminals at the tongue and lips, where the parts are metallic, or by suitably disposed terminals electrically connected to the magnet-coils and operated by the tongue and lips. When paper is present in normal conditions no circuit is closed, but when it is present in abnormal conditions the action of the paper will close the circuit through the normally open terminals carried by the moving tongue to energize the stop-magnet, the device being sensitive enough to respond to the resistance of the abnormal supply. The resistance of the paper is adjusted and varied by the relatively movable lips of the fixed lip member, which acts as an abutment or backing.

The embodiment of the various features of my invention may be changed and varied without departing from the scope thereof, and it may be applied and employed with any machine acting upon or manipulating sheets or webs of paper.

I make no claim in this application to the clutch herein shown, the same forming the subject-matter of an application filed by me Jan. 26, 1903 Serial Number 140,530, patented August 31, 1909, Number 932,558 and a division of my earlier application filed July 10, 1902, Serial Number 115,014.

Having described my invention, what I claim as new and desire to secure by Letters Patent is—

1. The combination with a paper handling machine, of an electromagnetic stop mechanism therefor, a pair of lips, a tongue, and a carriage on which the tongue is yieldingly mounted and which is moved positively relatively to the lips, the said tongue and carriage being provided with normally separated terminals adapted to be closed by the action of the paper to operate the stop mechanism.

2. The combination with a paper-handling machine, and an electromagnetic stop therefor, of a pair of lips, a tongue coöperating with the lips to close the circuit when no paper is present, a positively moved carriage on which the tongue is mounted, and a pair of terminals on the tongue and carriage adapted to close said circuit by the action of paper present between the tongue and lips.

3. The combination with a paper-handling machine having a shaft, of an electromagnetic controller therefor, means to manually energize the magnets thereof to start and stop the shaft, and means controlled by the paper to stop the shaft.

4. In a paper-handling machine, the combination with a shaft, a clutch therefor, and a controller to open and close the clutch, of an electromagnetic device whose armature operates the controller, and means controlled by the paper to close a circuit through the magnet.

5. In a paper-handling machine, the combination with a shaft, a clutch therefor, and a controller to open and close the clutch, of a pair of electromagnets having a common armature to operate the controller in opposite directions, manual means to close a circuit through either magnet, and means controlled by the paper to close a circuit through one of the magnets.

6. In a paper-handling machine, the combination with a shaft, a clutch therefor, and a controller to open and close the clutch, of a pair of electromagnets having a common armature to operate the controller in opposite directions, means to manually close the circuit through the starting-magnet, and means controlled by the paper to close the circuit through the stop-magnet.

7. In a paper handling machine, the combination with a shaft, of an electromagnet stop device therefor, a pair of stationary lips providing a mouth, a positively moved tongue alined with the mouth, means to energize the magnet when no sheet is present, and means controlled by the positively moved tongue to energize the magnet when an abnormal thickness of paper is present between the tongue and stationary member.

8. In a paper-handling machine, the combination with a shaft, of an electromagnetic stop device therefor, a pair of lips and a tongue in electrical extension of the magnet, and means to move the tongue to close the circuit through the lips.

9. In a paper handling machine, the combination with a shaft, of an electromagnetic stop-device therefor, a stationary member comprising a pair of lips, a tongue in electrical extension of the magnet, means to move the tongue between the lips, and means on the tongue to close the circuit when an abnormal thickness of paper is presented between the tongue and lips.

10. In a paper-handling machine, the combination with a shaft, of an electromagnetic stop device therefor, a stationary member provided with a pair of lips, a tongue between which and the lips the paper passes, a carriage on which the tongue is mounted, means to actuate the carriage to move the tongue between the lips, and a normally open circuit including the magnet and adapted to be closed through the tongue and carriage when an abnormal thickness of paper is interposed between the tongue and lips.

11. In a paper handling machine, the combination with a shaft, of an electromagnet stop device therefor, a pair of stationary lips, a movable tongue, means to move the tongue between the lips, a carriage on which the tongue is yieldingly mounted, and terminals of a normally open circuit including the magnet and adapted to be closed by the movement of the tongue between the lips.

12. In a stop-device for paper machines, the combination with a controller, of a tongue, and a member coöperating therewith and provided with lips adjustable with reference to each other.

13. In a stop mechanism, a movable tongue and a carriage therefor, a stop magnet terminals on the tongue and carriage adapted to be closed by the action of the paper to close the circuit through the stop magnet, a pair of lips providing a mouth to receive the tongue and one of which lips is adjustable with reference to the other.

14. In a stop-device, a movable tongue, and a relatively fixed member having adjustable lips between which the tongue is adapted to move.

15. In a stop device, a movable tongue, a relatively fixed member comprising a pair of lips providing a mouth to receive the tongue, and a guide for the paper at the mouth.

16. In a stop mechanism, the combination with an electromagnetic stop device, of a stationary member comprising a pair of lips providing a mouth, a reciprocating tongue adapted to enter the mouth, and a yielding paper guide carried by the stationary member and located at the mouth of the lips.

17. The combination with a paper handling machine, of an electromagnet stop mechanism therefor, a member having a mouth, a balanced tongue, and a pair of normally open terminals connected with the stop magnet and adapted to be moved into contact by the resistance of the paper.

In testimony whereof I affix my signature in presence of two witnesses.

HOMER C. LA BATT.

Witnesses:
WILLIAM J. HERRICK,
J. McROBERTS.